(12) United States Patent
Womer et al.

(10) Patent No.: US 6,672,753 B1
(45) Date of Patent: Jan. 6, 2004

(54) APPARATUS FOR PLASTICATING THERMOPLASTICS

(75) Inventors: Timothy W. Womer, Edinburg, PA (US); Effinger J. Buck, Hadley, PA (US); Bernard J. Hudak, Jr., Portersville, PA (US)

(73) Assignee: New Castle Industries, Inc., New Castle, PA (US)

( * ) Notice: Subject to any disclaimer, the term of this patent is extended or adjusted under 35 U.S.C. 154(b) by 124 days.

(21) Appl. No.: 10/083,427

(22) Filed: Feb. 25, 2002

(51) Int. Cl.$^7$ ................................................ B29B 7/42
(52) U.S. Cl. .............................. 366/88; 366/89; 366/90
(58) Field of Search ........................ 366/79–85, 88–90, 366/318–319, 322–324; 425/204, 208, 209

(56) References Cited

U.S. PATENT DOCUMENTS

| | | | |
|---|---|---|---|
| 2,753,595 A | 7/1956 | Dulmage | |
| 3,006,029 A | 10/1961 | Saxton | |
| 3,486,192 A | 12/1969 | Le Roy | |
| 3,524,222 A | 8/1970 | Gregory et al. | |
| 3,652,064 A | 3/1972 | Lehnen et al. | |
| 3,698,541 A | * 10/1972 | Barr | 366/343 |
| 3,941,535 A | 3/1976 | Street | |
| 4,000,884 A | 1/1977 | Chung | |
| 4,085,461 A | 4/1978 | Maillefer | |
| 4,128,341 A | * 12/1978 | Hsu | 366/89 |
| 4,201,481 A | 5/1980 | Iddon et al. | |
| 4,215,978 A | 8/1980 | Takayama et al. | |
| 4,227,870 A | 10/1980 | Kim | |
| 4,277,182 A | 7/1981 | Kruder | |
| 4,341,474 A | * 7/1982 | Wheeler, Jr. et al. | |
| 4,405,239 A | 9/1983 | Chung et al. | |
| 4,639,143 A | 1/1987 | Frankland, Jr. | |
| 4,752,136 A | 6/1988 | Colby | |
| 4,786,181 A | * 11/1988 | O'Brien | |
| 4,798,472 A | * 1/1989 | Chan et al. | |
| 5,141,326 A | * 8/1992 | Eshima | 366/88 |
| 5,215,764 A | 6/1993 | Davis et al. | |
| 5,599,097 A | * 2/1997 | Christie | 366/88 |
| 5,816,698 A | 10/1998 | Durina et al. | |
| 6,056,430 A | 5/2000 | Medici et al. | |
| 6,139,179 A | * 10/2000 | Christiano et al. | 366/80 |

FOREIGN PATENT DOCUMENTS

| | | | |
|---|---|---|---|
| EP | 0 046 631 | * | 3/1982 |
| GB | 2137893 | * | 10/1984 |
| JP | 59-202835 | * | 11/1984 |
| JP | 63-291632 | * | 11/1988 |

* cited by examiner

Primary Examiner—Charles E. Cooley
(74) Attorney, Agent, or Firm—Robert J. Herberger

(57) ABSTRACT

A plasticating screw having a feed section, barrier melting section, reorientation section and metering section disposed sequentially downstream wherein solid material is moved from a trail side of a main flight to a push side of the main flight in the reorientation section. The reorientation of solids is accomplished by discontinuing a barrier flight at a terminal end of said barrier melting section. The main flight decreases its pitch and continues into the reorientation section, which has a longitudinal length at least 360° about the screw axis. A melt channel and solids channel in said barrier melting section merge into a substantially uniform reorientation channel in the reorientation section so that solid plastic material conveyed along the reorientation section moves toward the push side of the main flight. A secondary flight is disposed in the metering section intermediate the main flight, whereby solids conveyed along the metering section are positioned primarily adjacent the push side of the main flight and melt is positioned primarily adjacent the trailing side.

16 Claims, 4 Drawing Sheets

APPARATUS FOR PLASTICATING THERMOPLASTICS

FIELD OF INVENTION

This invention relates to plasticating using a screw rotatable within a barrel to extrude or inject molten resinous material. More particularly, this invention is concerned with improvements in melting and mixing the resinous material using a screw having a material reorientation section between a barrier melt section and an undulating metering section.

BACKGROUND OF THE INVENTION

A plasticating apparatus commonly used today receives polymer or thermoplastic resin pellets, granules or powders, from an inlet port, then heats and works the resin to convert it into a melted or molten state. The melt or molten material is delivered under pressure through a restricted outlet or discharge port to make the finished article. It is desirable that the molten material leaving the apparatus be completely melted and homogeneously mixed, resulting in uniform temperature, viscosity, color and composition.

Typically, the basic plasticating apparatus has an elongated cylindrical barrel which is heated at various locations along its length. An axially supported and rotating screw extends longitudinally through the barrel. The screw is responsible for forwarding, melting, pressurizing and homogenizing the material as it passes from the inlet port to the outlet port. Typically, the screw has a core with a helical flight thereon and the flight cooperates with the cylindrical inner surface of the barrel to define a helical valley for forward passage of the resin to the outlet port.

There are several different types of thermoplastic resins or polymers, and each has different physical properties and characteristics. Therefore, there are several different screw configurations. In general, however, the typical plasticating screw has a plurality of sections along its extended axis with each section being designed for a particular function. Ordinarily, there is a feed section, a melting section and a metering section in series. In the art, the melting section has been referred to interchangeably as the intermediate, compression or transition section.

The feed section extends forward from the inlet port of feed opening where solid thermoplastic resins, in pellet, granular or powder form, are introduced into the apparatus and pushed forward by the screw along the inside of the barrel. The resin is then worked and heated in the melting section. After approximately 40 to 80 percent of the resin has been melted, solid bed breakup occurs, and solids become randomly dispersed within the melt. It is important to note that most melting initially occurring in the melting section takes place at or near the heat source of the inner wall of the barrel.

To assure a homogeneous melt, therefore, it is often important that solid material be separated from the molten material in the melting section using a barrier to create two adjacent helical channels, a solids channel and melt channel with a barrier flight therebetween, so that the thin melt film which develops at the outer periphery of the solids channel at the inner wall of the barrel is conveyed over the barrier flight and upstream into the adjacent melt channel. As described in more detail by Chung, in U.S. Pat. No. 4,000,884, and further developed by Medici, et al. in U.S. Pat. No. 6,056,430, the typical barrier melting section maximizes the amount of contact between the solid material and the heated inner surface of the barrel wall. As further explained by Medici, et al. in U.S. Pat. No. 6,056,430, conventional barrier melting sections provide for the solid material to be located on the "trail side" of the main flight, whereas the melt material is located at the "push" side of the main flight Therefore, it is important to move solids to the push side of the main flight in the metering section of the plasticating screw to provide higher pressure and shear which mixes and melts solids more effectively. Medici, Jr. et al. accomplishes the interchange as described in U.S. Pat. No. 6,056,430, by reversing the diameter and width of the primary and secondary flights at the terminal end of the mixing section. As an alternative, Medici, Jr., et al., uses a barrier flight having a short section of increased pitch at the terminal end of the barrier melt section which abruptly narrows the solids channel and thereby forces solid material over the barrier flight into the melt channel and on the pushing side of the primary flight before the metering section.

Although the configuration made by Medici, Jr., et al., in U.S. Pat. No. 6,056,430 may satisfy many general needs, thermal and composite mixing can be improved even more for various thermoplastic resin and polymer materials by including a more novel reorientation section between a multi-channel barrier melting section and the undulating metering section to better allow reorientation of solid and molten materials. Additional melting can take place via heat convection from the molten material. At the same time this invention permits greater temperature control to avoid the overheating or degradation of the resin. Further, the cost and time needed to manufacture the screw of the instant invention is reduced since intricate structure described by the Medici, Jr., et al., patent is eliminated in the instant invention and unique functional elements and parameters added and described.

Ultimately, the primary objective of the instant invention is to homogeneously mix select resins using an optimum combined barrier melting section and multi-channel undulating metering section, resulting in a completely molten material having uniform temperature, viscosity, color and composition at the terminal end of the metering section.

SUMMARY OF INVENTION

Medici, Jr. et al., confirms in U.S. Pat. No. 6,056,430 that multi-channel wave metering screws and barrier melting screws are well known. The present invention, like Medici, Jr., et al., modifies and combines the two technologies. Unlike Medici, Jr., et al., however, the instant invention eliminates the "interchange" at the terminal end of the barrier melting section, and describes and claims, instead, a unique reorientation section between the barrier melting section and undulating metering section.

Throughout a plasticating screw, higher pressure and shear rates are obtained on the push side of the main flight since the main flight, as opposed to the barrier or secondary flights, provide reduced clearance with the inner barrel wall and an increased thread width, which in turn produces greater shear rates for the material being conveyed. Often, however, in conventional plasticating screws, the solids are located primarily on the trail side of the main flight instead of the push side of the main flight throughout. The present invention overcomes this disadvantage by providing a screw having a multi-channel barrier melting section and a reorientation section for transferring a major portion of the solids to the push side of the main flight before entering a undulating metering section.

The present invention is a plasticating apparatus comprising a barrel having an inlet and an outlet. A rotatable screw having a longitudinal axis is disposed within and cooperates with an inner wall of said barrel. The screw comprises a feed section, a barrier melting section, a reorientation section and a multi-channel undulating metering section located subsequently downstream along said screw axis. The feed section includes a main helical flight having a push side facing downstream and a trailing side facing upstream. A barrier flight is disposed in said barrier melting section, intermediate said main flight, and said barrier flight with the main flight divides the barrier melting section into a melt channel and solids channel extending helically side by side. The barrier flight includes helical threads with a diameter less than the diameter of the helical threads of said main flight, so that melt material flows over said barrier flight and into said melt channel. This allows melt material conveyed along the barrier melting section to be positioned adjacent the push side of said main flight.

To switch solids to the push side of the main flight in the present invention to take advantage of the higher shear thereof, the barrier flight terminates near the terminal end of the barrier melting section. Following the terminal end of the barrier melting section, the pitch of the main helical flight decreases and then traverses continuously through the reorientation section at least one turn or 360° degrees along the longitudinal axis of the screw. Further, the solids channel and the melt channel in the barrier melting section merge into a substantially uniform reorientation channel at a location substantially coinciding with the decreased pitch of the main flight, thereby forcing solid plastic material conveyed into the reorientation section to move toward the push side of the main flight. After the reorientation section, the main flight traverses into the metering section with a secondary flight being introduced and disposed in said metering section intermediate the main flight whereby solid material conveyed along the metering section is positioned primarily adjacent the push side of the main flight.

Thus, one advantage of the present invention is that the melt material conveyed along the metering section is positioned primarily adjacent to the trail side of the main flight, allowing higher pressure and shear to be applied to the remaining solids. Since the secondary flight is undercut and thinner than the main flight, the secondary flight does not provide the shear and pressure of the main flight. By placing solids on the push side of the main flight in the metering section, the present invention applies higher pressure and shear rates to the solids.

Another advantage of the present invention is that the length of the reorientation section and depth of the reorientation channel may be easily changed to accommodate the various lengths and diameters of plasticating screws.

Many other objectives and features of the present invention will be obvious to those of skill in the art upon contemplation of the entire disclosure herein in connection with the accompanying drawings.

DESCRIPTION OF THE DRAWINGS

It is to be understood, however, that the drawings are designed for the purpose of illustration only and not as a definition of the limits of the instant invention, for which reference should be made to the claims appended hereto. Other features, objects and advantages of this invention will become clear from the following more detailed description made with reference to the drawings in which:

DESCRIPTION OF THE PREFERRED EMBODIMENT

Figure 1:
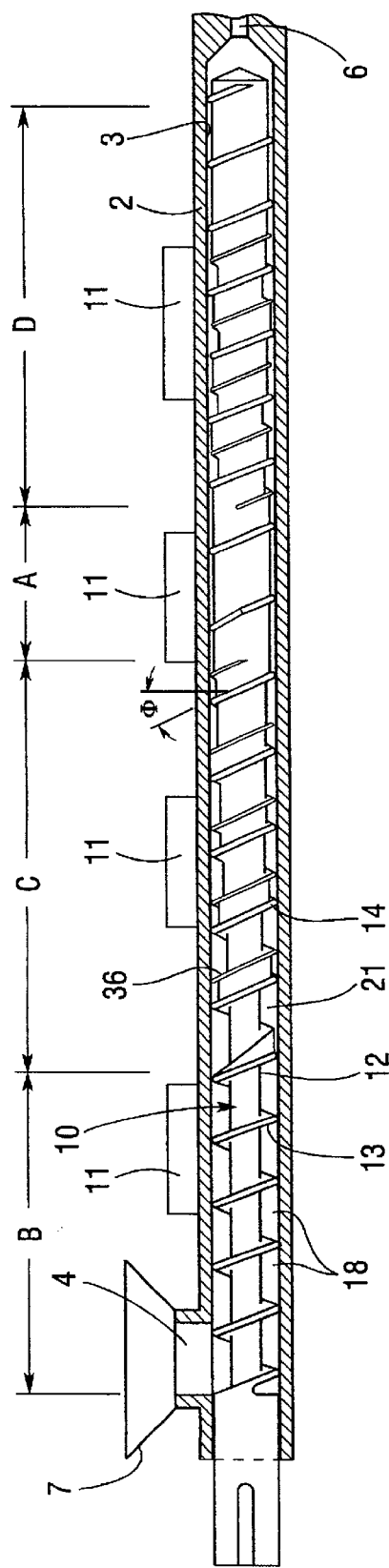
FIG. 1 shows a side elevational view of a plasticating apparatus with the barrel broken away to expose the screw according to the present invention.

Referring to FIG. 1, a plasticating apparatus can be seen comprising a cylindrical barrel 2 with an inner surface or wall 3. The barrel 2 is provided with inlet port 4 for the admission, via a feed hopper 7, of one or more solid particulate resinous materials and any required additives or agents. The barrel 2 is also provided with a discharge or outlet port 6 for the discharge of plasticated molten extrudate to a mold or die (not shown) or other exit configuration. Any conventional heating elements 11 can be provided outside of the barrel 2 for applying heat to the barrel 2. There may also be a vent through the barrel 2 of the apparatus so that any undesirable matter in the resin may volatilize or that other materials may be introduced later in the process.

Within the barrel 2 is an axially supported screw 10 which is rotated and which extends from the inlet port 4 to the outlet port 6. In the preferred embodiment the screw 10 includes a main helical flight 13 radially extending from and winding around a core or shaft 12, typically in a right hand threaded direction.

The main helical flight 13 includes a flight land 14 which moves in close cooperative association with the inner wall 3 of the barrel 2 with a clearance therebetween of about 0.005 to 0.007 inches. The main helical flight 13 defines a helical valley 21 forming a main helical channel 18 bounded by flight 13, inner wall 3 of the barrel 2 and the surface of the core 12. The depth of the helical valley 21 is measured radially from the core surface to the inner surface 3 of the barrel 2 and is referred to as the root depth. With the rotation of the screw 10, the helical channel 18 forces a forward flow of resinous materials.

The screw 10 includes a plurality of sections along its axial length, with each section intended to achieve a particular function. There is typically a relatively deep root feed section B for the admission, heating and working of solid resin, a transition or melting section C of reducing root depth to adapt to the reduced volume of resin due to melting and the elimination of air spaces between the solid particles, and a relatively shallow root metering section D wherein the majority of the resin is predominantly in a molten state. The inlet port 4 is typically at the rear-most part of the upstream feed section B and the outlet port 6 is located at the forward-most part of the downstream metering section D.

In the instant invention, the melting section C is a barrier melting section, and the metering section D is a multi-channel undulating metering section, as described below in more detail. In addition to these sections, the instant invention includes a reorientation section A, also referred to herein as a reorientation section, disposed between the barrier melting section C and undulating metering section D.

Figure 2:
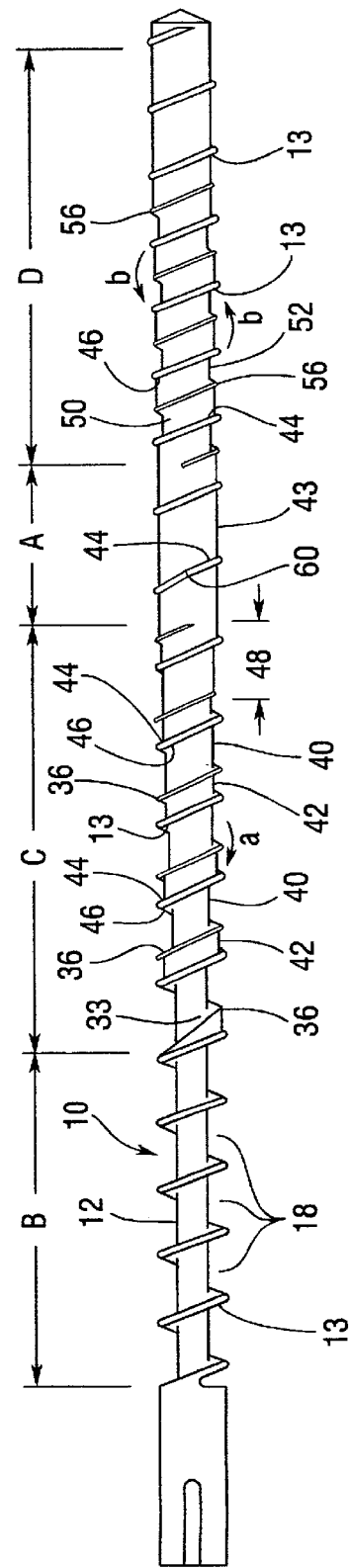
FIG. 2 shows an enlarged view of the screw illustrated in FIG. 1.

With reference to FIG. 2, disposed at the end of feed section B is a barrier flight 36 which is generated downstream of main flight 13 by machining its helix angle θ at a greater angle than that of flight 13 for approximately one-half turn (180°). At this point, shown at 33 in FIG. 2, the main flight 13 runs parallel to the barrier flight 36 throughout the barrier melting section C.

As shown in FIG. 2, the barrier melting section C is divided into a solids channel 40 and a melt channel 42 with barrier flight 36 disposed therebetween. As can be seen in FIG. 2, barrier flight 36 is undercut, or has a smaller diameter than does main flight 13. That is, the barrier flight 36 has a diameter which is 0.030 to 0.070 inches less than the diameter of the main flight 13. Thus, as plasticated material is conveyed downstream along screw 10 through barrier melting section C, a thin layer of melt material forms at the outer periphery of solids channel 40. This melt material is encouraged to flow over the undercut barrier flight 36 and into melt channel 42 so that further solids can be melted between the outer periphery of solids channel 40 and the interior wall 3 of the barrel 2. Thus, traversing downstream along barrier melting section C, the solids channel 40 decreases in depth whereas the melt channel 42 increases in depth to accommodate the increasing amount of melt material and the corresponding decreasing amount of solid material. It is desirable to maintain the width of the solids channel 40 constant throughout the barrier melting section C in order to avoid disturbing the solid bed.

Figure 3:
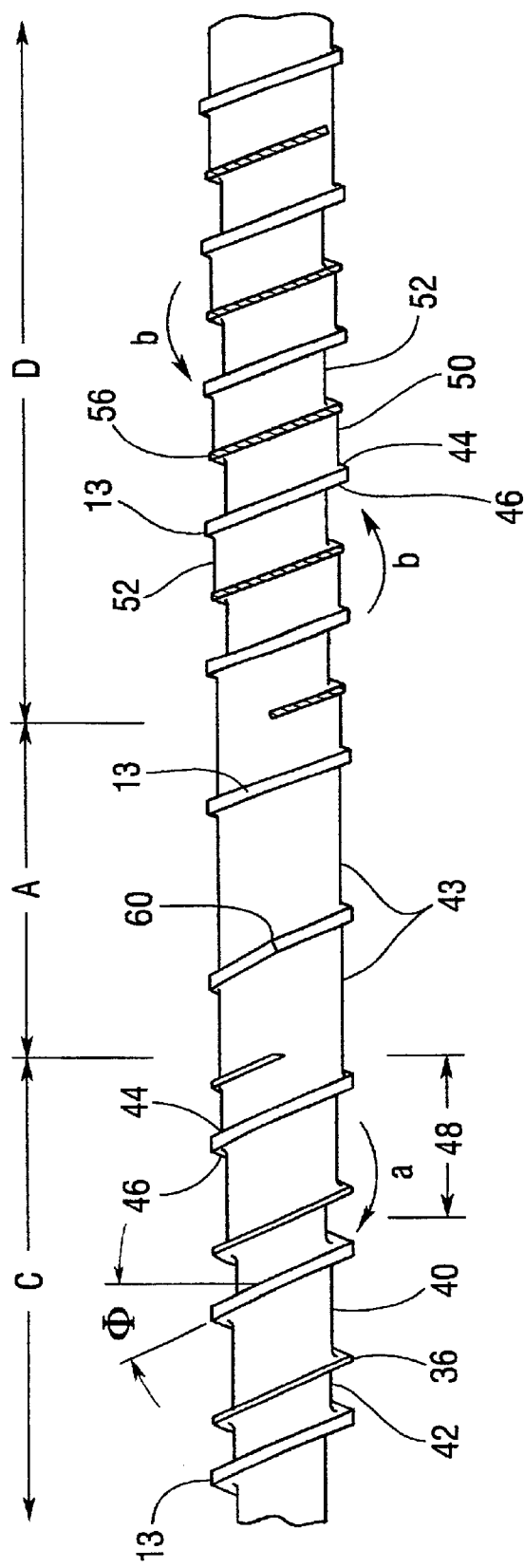
FIG. 3 is an enlarged partial view showing the terminal end of the barrier melting section, reorientation section and beginning of the undulating metering section.

As further shown in FIG. 2, main flight 13 includes a push side 44 and a trailing side 46. Traversing downstream along barrier melt section C, it can be understood that the solids channel 40 is positioned on the trailing side 46 of main flight 13 and the melt channel 42 is positioned on the push side 44 of main flight 13. Near the terminal end 48 of barrier melting section C, however, the barrier flight discontinues, as best seen in FIG. 3. Substantially simultaneously with the termination of the barrier flight 36, the melt channel 42 begins to merge with the solids channel 40 to form a substantially uniform reorientation channel 43 at the reorientation section A.

Further, the merging of the solids channel 40 and the melt channel 42 ends and the reorientation channel 43 begins at a location substantially coinciding with a decreased pitch of said main flight 13 to force solid plastic material conveyed along said reorientation section A toward said push side 44 of the main flight 13. In the illustrated embodiment, the merging of the solids channel 40 with the melt channel 42 of the present invention is complete within one turn or 360° about the longitudinal axis of the screw 10.

The depth of the reorientation channel 43 is preferably constant throughout the reorientation section A, although it may decrease from start to end by 10% without significantly affecting the performance of the present invention. Preferably, the compression ratio with reference to the last channel 43 of the reorientation section A is between 2.3 to 2.5. As used herein, the term "compression ratio" shall mean the ratio of the volume of material held in the first channel at the feed section to the volume of material held in the referenced channel.

Figure 4:
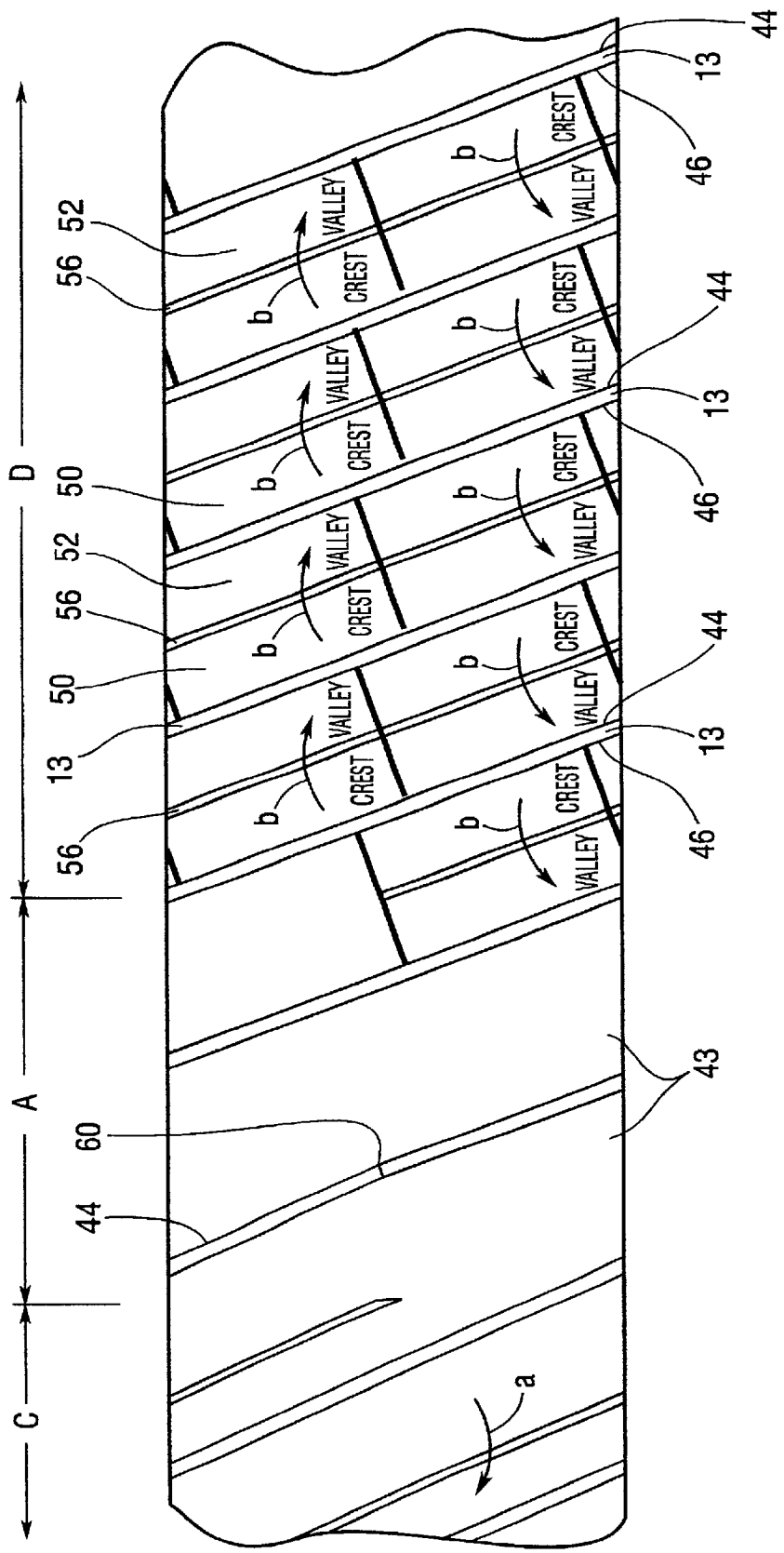
FIG. 4 is a side elevational view of FIG. 3 unwrapped in 360° increments placed adjacent to one another showing the termination of the barrier flight, merger of the solids and melt channels into the reorientation channel, decreased pitch of the main flight through the reorientation section, and the start of the secondary flight in the metering section.
Figure 5:
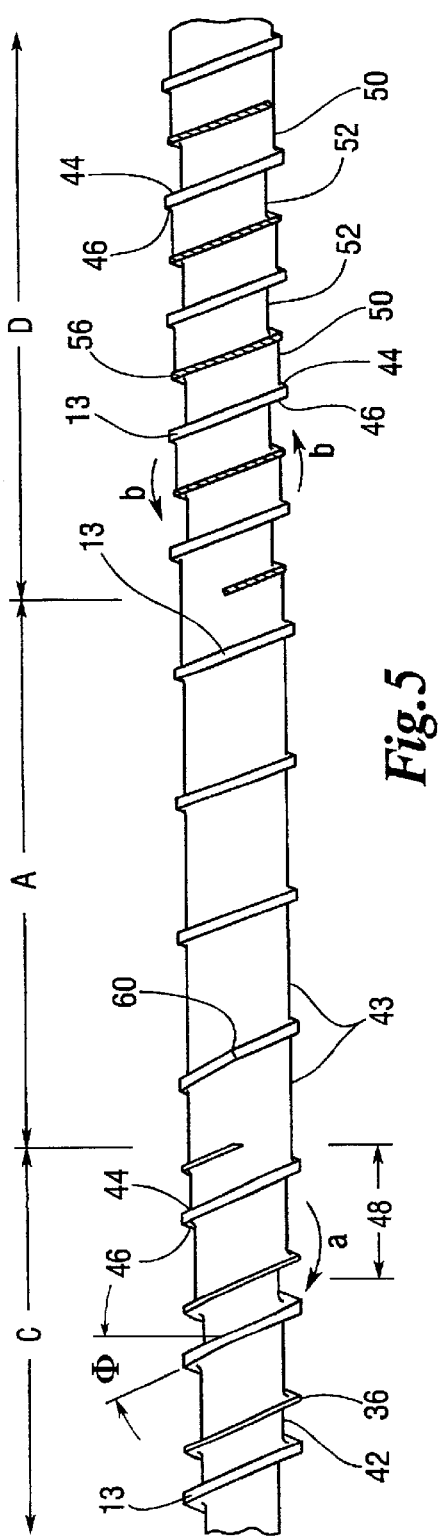
FIG. 5 is an illustration of the same as shown in FIG. 4 but with alternative length of the reorientation section.

As shown in FIGS. 3 and 4, the main helical flight 13 traverses through the reorientation section A. The entire reorientation section of the present invention could extend between one turn (360°) to four turns (1440°) of the main flight 13 about the longitudinal axis of said screw 10. In the embodiment shown in FIGS. 2 and 3, it is preferred that the reorientation section A is approximately 720° or two turns. A reorientation section A with approximately four turns is shown in FIG. 5. As previously described, in the present invention the main flight 13 in the reorientation section A has a decreased pitch beginning substantially adjacent to the terminal end of the barrier melting section C shown at 60 and uniformly resumes, preferably, its decreased pitch therethrough.

The main flight 13 then passes into the undulating metering section D. A secondary flight 56 emerges in the undulating metering section D, being disposed intermediate said main flight 13, thereby forming a new solids channel 50 located on the push side 44 of the main flight 13 and a new melt channel 52 located on trailing side 46 of main flight 13. The secondary flight 56 has a diameter which is 0.09 to 0.10 inches less than the diameter of the main flight 13.

With further reference to FIG. 2, in the four sections in this invention (feed, mixing, reorientation and metering), the helix angle θ of the main helical flight 13 traversing therethrough changes as previously discussed. More specifically, in the feed section the helix angle θ of the main helical flight 13 is between 17.7° to 20.0°. In the barrier melting section C, the helix angle θ is preferably between 17.7° to 25.5°. In the reorientation section A and undulating metering section D the helix angle θ is preferably reduced 15% to 20% from the helix angle θ of the melting section C. The helix angle θ may vary between the reorientation section A and undulating metering section D within the range identified herein (15% to 20% less than the helix angle θ of the barrier melting section), however, preferably the helix angle θ therebetween is constant. In the illustrated embodiment, the helix angle θ in the feed section B is equal to 20.0°, the helix angle in the barrier melting section C is 23.6°, and the helix angle θ in the reorientation section A and undulating metering section D is substantially uniform at 19.5°. As used herein, the helix angle θ is equal to the inverse tangent of the lead length divided by the circumference of the root body at the point of the screw 10 where the helix angle θ is being determined.

The operation of the screw 10 in accordance with the present invention can be explained with reference to the figures. With reference to FIG. 1, plastic material in the form of pellets or dry powder is fed into hopper 7. Hopper 7 communicates with channel 18 of feed section B and conveys the plastic material therealong with screw 10 rotation. The plastic material is heated and worked as it is conveyed along feed section B by main flight 13. That is to say, heat applied from barrel 2 and shear forces resulting from the conveyance along feed section B cause the solid plastic material to begin to melt. As previously stated, melting occurs primarily in the outer periphery of the channel 18 or at the barrel wall in an area adjacent the inner wall 3 of the screw barrel 2, whereby a thin layer of melt material forms. In barrier section C, the thin melt film is encouraged to cross over the undercut barrier flight 36 and into the newly formed melt channel 42 as shown by arrows 'a' in FIG. 2. Solids continue to melt and are transferred from solid channel 40 to melt channel 42 along barrier melting section C.

Figure 6:
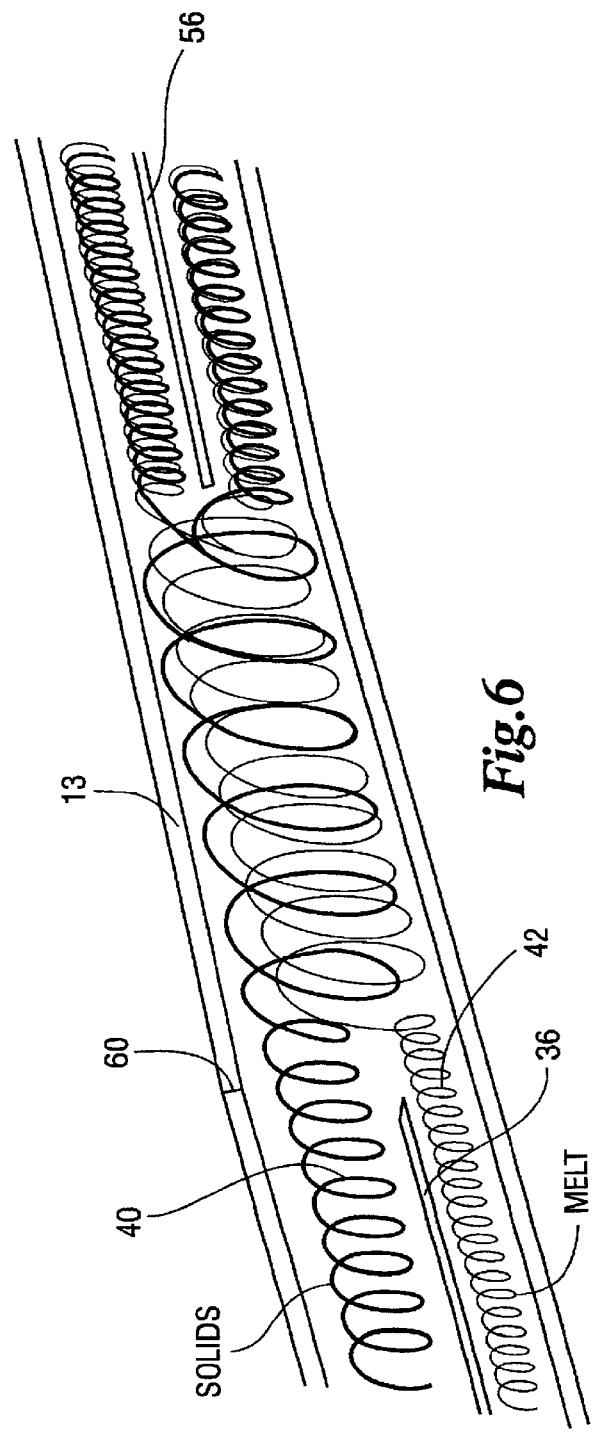
FIG. 6 is an illustration of the reorientation of the melt material and solid material as they pass from the mixing section through the reorientation channel to the metering section.

Toward the end of barrier melting section C, solids in channel 40 are located adjacent the trailing side 46 of main flight 13 and melt in channel 42 is located adjacent the push side 44 of main flight 13. However, as noted, solids are more quickly transformed to a melt by placing them on the push side 44 of main flight 13 due to the increased pressure and shear force provided by the main flight 13. Accordingly, the above described reorientation section A of the present invention reorients a primary portion of the remaining solids to the push side of main flight 13 which then continues into and through the metering section D. Thus, as shown in FIG. 6, the bulk of the unmelted solid material is placed on the high pressure, high shear push side 44 of the main flight 13 and melting thereof is thereby enhanced. At the same time, melt material is separated by and is forced to flow over secondary flight 13 in the undulating metering section D, as shown by arrows 'b' in FIGS. 2, 3 and 4 in order to enhance mixing, to achieve a more uniform temperature, viscosity, color and composition at the terminal end of the metering section.

It will thus be seen that a new and useful plasticating apparatus, method and improved longitudinal portion have been illustrated and described. It will be apparent to those skilled in the art that various changes or modifications may be made to the invention without departing from the spirit thereof.

What is claimed is:

1. A plasticating apparatus comprising:
   a barrel having an inlet and an outlet;
   a rotatable screw disposed within and cooperating with an inner wall of said barrel, said screw adapted for plasticating resinous material fed into said barrel through said inlet, said screw comprising;
   a longitudinal axis with a feed section, a barrier melting section and a metering section disposed sequentially downstream along said screw axis, a reorientation section is disposed between the barrier melting section and the metering section;
   said screw including a main helical flight having a push side and a trailing side, said main flight forming a feed channel at said inlet of said screw;
   a barrier flight disposed in said barrier melting section intermediate said main flight, said main flight having a constant pitch in the barrier melting section, said barrier flight and said main flight dividing said barrier melting section into a melt channel and a solids channel extending helically side by side, said barrier flight having helical threads with a diameter less than the diameter of helical threads of said main flight, so that melt material flows over said barrier flight and into said melt channel, whereby solid material conveyed along said barrier melting section is positioned adjacent said trailing side and whereas melt material conveyed along said barrier melting section is positioned adjacent said push side;
   said barrier flight discontinuing at a terminal end of said barrier melting section;
   said main helical flight passing into the reorientation section makes a rotation of at least 540° about said screw axis at a pitch less than the pitch of the main flight in the barrier melting section, said melt channel and said solids channel in said barrier melting section merging into a substantially uniform reorientation channel in said reorientation section thereby forcing solid plastic material conveyed along said reorientation section toward said push side of the main flight; and
   a secondary flight disposed in said metering section intermediate said main flight, and said main flight continuing into said metering section from the reorientation section, whereby solid material conveyed along said metering section is positioned primarily adjacent said push side of the main flight and whereas melt material conveyed along said metering section is positioned primarily adjacent said trailing side of the main flight.

2. The apparatus of claim 1, wherein said main flight has a substantially constant diameter throughout said metering section and said barrier flight has a substantially constant diameter throughout said barrier melting section.

3. The apparatus of claim 1, wherein said main flight has a thread width greater than said secondary flight in said metering section.

4. The apparatus of claim 1, wherein said barrier flight has a diameter substantially the same as said secondary flight.

5. The apparatus of claim 4, wherein said barrier flight has a width substantially the same as said secondary flight.

6. The apparatus of claim 5, wherein said metering section is a multi-channel undulating metering section.

7. A plasticating apparatus comprising:
   a barrel having an inlet and an outlet;
   a rotatable screw having a longitudinal axis, the screw being disposed within and cooperating with an inner wall of said barrel, said screw adapted for plasticating resinous material fed into said barrel through said inlet, said screw comprising;
   a feed section, a barrier melting section, a reorientation section and a multi-channel undulating metering section located sequentially downstream along said screw axis;
   said screw including a main helical flight having a push side and a trailing side, said main flight forming a feed channel at said inlet of said screw at the feed section;
   a barrier flight disposed in said barrier melting section intermediate said main flight, said barrier flight and said main flight dividing said barrier melting section into a melt channel and a solids channel extending helically side by side, said barrier flight having helical threads with a diameter less than the diameter of helical threads of said main flight so that melt material flows over said barrier flight and into said melt channel, whereby solid material conveyed along said barrier melting section is positioned adjacent said trailing side of said main flight and whereas melt material conveyed along said barrier melting section is positioned adjacent said push side of said main flight;
   said barrier flight terminating at a terminal end of said barrier melting section;
   said main helical flight traversing through the reorientation section having a rotation at least 360° about the longitudinal axis of said screw, said main flight including a decreased pitch beginning substantially adjacent to the terminal end of said barrier melting section and resuming said decreased pitch through said reorientation section, said solids channel and said melt channel merge into a substantially uniform reorientation channel at a location substantially coinciding with said decreased pitch of said main flight thereby forcing solid plastic material conveyed along said reorientation section toward said push side of the main flight; and
   said main flight passing into said metering section, a secondary flight being disposed in said metering section intermediate said main flight whereby solid material conveyed along said metering section is positioned primarily adjacent said push side of the main flight and whereas melt material conveyed along said metering section is positioned primarily adjacent said trailing side of the main flight.

8. The apparatus of claim 7, wherein said solids channel and said melt channel maintain substantially constant widths through said barrier melting section, said solids channel narrows at a position along said screw coinciding with said decreased pitch of the main flight.

9. The apparatus of claim 7, wherein the main helical flight passing into the reorientation section makes a rotation of at least 720° about said screw axis.

10. The apparatus of claim 7, wherein the main helical flight passing into the reorientation section makes a rotation of at least 1440° about said screw axis.

11. The apparatus of claim 7, wherein the main helical flight of the reorientation section having a helix angle θ of approximately 19.5°.

12. The apparatus of claim 11, wherein the helix angle θ of the main helical flight of the reorientation section and the melting section are substantially equal.

13. A plasticating apparatus comprising:
- a barrel having an inlet and an outlet;
- a rotatable screw having a longitudinal axis, the screw being disposed within and cooperating with an inner wall of said barrel, said screw adapted for plasticating resinous material fed into said barrel through said inlet, said screw comprising;
  - a feed section, a barrier melting section, a reorientation section and a multi-channel undulating metering section located sequentially downstream along said screw axis;
  - said screw including a main helical flight having a push side and a trailing side, said main flight forming a feed channel at said inlet of said screw at the feed section;
  - a barrier flight disposed in said barrier melting section intermediate said main flight, said barrier flight and said main flight dividing said barrier melting section into a melt channel and a solids channel extending helically side by side, said barrier flight having helical threads with a diameter less than the diameter of helical threads of said main flight so that melt material flows over said barrier flight and into said melt channel, whereby solid material conveyed along said barrier melting section is positioned adjacent said trailing side of said main flight and whereas melt material conveyed along said barrier melting section is positioned adjacent said push side of said main flight;
  - said barrier flight terminating at a terminal end of said barrier melting section;
  - said main helical flight traversing through the reorientation section having a rotation at least 540° about the longitudinal axis of said screw, said main flight including a decreased pitch beginning substantially adjacent to the terminal end of said barrier melting section and resuming said decreased pitch through said reorientation section wherein the main flight has a helix angle θ between 15° and 21°, said solids channel and said melt channel merge into a substantially uniform reorientation channel at a location substantially coinciding with said decreased pitch of said main flight thereby forcing solid plastic material conveyed along said reorientation section toward said push side of the main flight; and
  - said main flight passing into said metering section, a secondary flight being disposed in said metering section intermediate said main flight whereby solid material conveyed along said metering section is positioned primarily adjacent said push side of the main flight and whereas melt material conveyed along said metering section is positioned primarily adjacent said trailing side of the main flight.

14. The apparatus of claim 13, wherein the helix angle θ of the main helical flight of the reorientation section and the melting section are substantially equal.

15. The apparatus of claim 14, wherein said barrier flight has a diameter substantially the same as said secondary flight.

16. The apparatus of claim 15, wherein said barrier flight has a width substantially the same as said secondary flight.

* * * * *